United States Patent

Gunkel

[15] 3,705,546
[45] Dec. 12, 1972

[54] FRUIT PRESS

[72] Inventor: Otto Gunkel, Badgasse 34, Heilbronn, Germany

[22] Filed: Feb. 24, 1971

[21] Appl. No.: 118,352

[30] Foreign Application Priority Data

Feb. 25, 1970 Germany..................P 20 08 738.1

[52] U.S. Cl...............................................100/118
[51] Int. Cl..............................................B30b 9/24
[58] Field of Search......100/116, 118, 119, 120, 151, 100/152, 153, 154

[56] References Cited

UNITED STATES PATENTS 3,236,176  2/1966  Fischer.............................100/195

FOREIGN PATENTS OR APPLICATIONS 1,502,249  2/1969  Germany.............................100/118

*Primary Examiner*—Peter Feldman
*Attorney*—Walter Becker

[57] ABSTRACT

A press for pressing juices from fruit mash and the like, in which the mash is delivered to a filter cloth that is moved into the press between a press punch and the bed member and beneath which filter cloth is a grate band between the bars of which the expressed juice flows to a collecting trough.

The press, furthermore, has at least one table member suspended from the press punch and which table member also carries a grate band and a filter cloth. A charging device supplies fruit mash to both of the filter cloths to be conveyed into pressing condition so that in one pressing operation at least two layers of fruit mash are pressed. The grate bands and filter cloths are intermittently driven and cleaning devices are provided for the cleaning thereof following each pressing cycle. Each table member has a cover plate on the bottom beneath the return reach of the respective grate band and filter cloth and a cover cloth is provided for the lower face of the cover plate.

11 Claims, 4 Drawing Figures

FRUIT PRESS

The present invention relates to a fruit press with a press stage in the form of a hand press or punch press and with a first grate band which is driven stepwise and passed from a charging device for the fruit mash to be pressed or squeezed out to a press stage and through the press stage. The grate band passes within the range of the press stage over a press table and is at least within the range of the press stage covered by an endless filter cloth. The fruit press furthermore comprises at least a second grate band which passes from the charging device to the press stage and through the latter and which is likewise advanced stepwise. This last mentioned grate band as well as a pertaining filter cloth are passed over deviating or reversing rollers ahead of and behind the press punch in such a way that the two sections of this grate band are passed between the first grate band, engaging the press table, and the press punch.

It is an object of the present invention to provide a fruit press which will overcome the heretofore encountered drawback of an insufficient de-juicing when pressing out a plurality of layers of fruit mash.

This object and other objects and advantages of the invention will appear more clearly from the following specification in connection with the accompanying drawings, in which.

Figure 4:
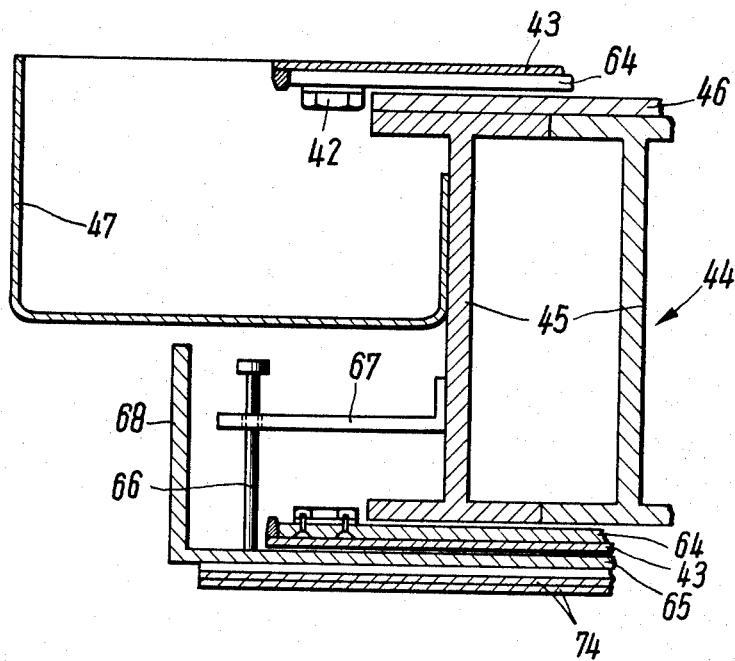
FIG. 4 is a section taken along the line IV—IV through a marginal section of the support of FIG. 2, FIG. 4 likewise being shown on a larger scale than FIG. 2.

The fruit press according to FIG. 4 is characterized primarily in that on the press punch for each further grate band there is suspended a carrier or support which within the range of the press punch forms a closed table surface around which is looped the pertaining grate band and the filter cloth. The deviating or reversing rollers for the grate band and the filter cloth are journalled in a frame part adjacent the table plate while to the bottom side of the table plate there is connected a cover plate for the grate band section which is passed below the table plate, the cover plate being movable within certain limits perpendicularly to the table plate.

In view of the arrangement of a closed table plate between the superimposed quantities or layers of the fruit mash to be pressed out, care is taken to the effect that the juice pressed out from each quantity or layer of the fruit mash flows off and is collected independently of the juice of the other quantity or layer. The top sides of the masses of mash separated by a trickling grate are not so plane that the pressed out juice will flow off properly therefrom, but between the spars of the trickling grate on the top side of each mass of mash there will be retained a certain quantity of juice which, when relieving the pressing pressure, will be drawn in again in a sponge-like manner by the dry mash and therefore will be lost. For this reason it is also advantageous to see to it that with the fruit press according to the invention no grate-like structure will be present at the top side of the mass of mash, but that there will be present either the smooth bottom side of the punch or the smooth cover plate of the closed section of the carrier or support which forms the table plate, so that also in this instance no cavities will be present above the mash in which the juice could be retained which juice would again be drawn into the mash when relieving the pressing pressure. Therefore, the present invention greatly improves the withdrawal of juice in contrast to the method customary for decades. The present invention thus makes it possible to provide substantially automatically operating fruit presses which by simultaneously pressing out a plurality of layers yield a high output and a high withdrawal rate of the juice so that such fruit presses are extremely economical.

According to a further development of the invention, the bottom side of the cover plate may be covered by a filter cloth for the mash layer on the grate band located below the cover plate. The application of such cloth at the bottom side of the press punch itself is known. Such cloth has the advantage that it permits a flowing off of juice between the top side of the mash layer and the bottom side of the cover plate so that no major quantities of juice will remain on the surface of the mash. Instead, the juice which has been absorbed by the cover cloth during the pressing operation is substantially retained in the cloth so that it does not again return to the mash layer. Therefore, it is particularly advantageous to employ relatively thick and narrow-mesh cloths as cover cloths.

Fundamentally it would be possible to pass the filter cloth associated with the wider grate band separately from said grate band along the bottom side of the cover plate of the carrier and to employ the filter cloth in this way as cover cloth. Such filter cloth, however, does not have the properties which would be most desirable for a cover cloth, and difficulties would exist with regard to the detachment of that section of the filter cloth which serves as cover cloth from the pulp layer therebelow after the pressing operation. Therefore, it is more advantageous to have the filter cloth together with the grate band located above the plate and to provide for a separate cover cloth which is kept in front of and behind the table plate. It is particularly advantageous to design the cover cloth as endless cloth and to pass the same over rollers so that the bottom side of the cover plate is covered by two layers. In view of these two layers, the cover cloth will have particularly good suction and drainage properties. It is, however, of particular importance that the cloth, when pulling out the grate band therebelow, is taken along by the pulp particles which can penetrate into the cover cloth and that the pulp layer at the reversing area of the cover cloth can peel off from the cover cloth. In this way a good separation of the pulp from the cover cloth is obtained and the cover cloth will over a long working period remain sufficiently clean without requiring additional steps for cleaning the cover cloth. In order to facilitate the starting movement of the cover cloth when advancing the grate band therebelow, it is expedient to mount the roller which is adjacent to the charging device and which is intended for the cover cloth resiliently in the longitudinal direction of the cover cloth.

In order to avoid losses during the pressing operation as far as possible and in order furthermore to be able to convey the juice as fast as possible to closed containers in which the juice is protected against harmful air enclosures, it is suggested according to a further development of the invention to surround the table plate of each carrier with a juice trough of its own. Discharge conduit means or passages of the juice troughs may in a simple manner lead into the juice trough of a table plate arranged therebelow, especially of the press table. From here the juice will flow in a manner known per se into suitable containers through hoses or the like.

According to a further development of the invention, driving rollers journalled in the carrier and intended for the grate band and the filter cloth are operatively connected to the drive for the first grate band and its filter cloth through the intervention of a transmission which established a driving connection with the driving rollers only when the carrier is in its upper rest position. By the employment of a common drive for the first and the other grate bands, it will be assured that all grate bands will simultaneously advance by the same distance, in other words, completely synchronously. Moreover, this step will assure that a driving connection can be established only when the further grate bands are lifted and that an advance of said bands will be possible only with a lifted press punch, in other words, when the press is completely relieved of pressure. The transmission may, in a simple manner, comprise a belt or chain drive the driving element of which will only in the uppermost position of the carrier firmly extend around the pertaining carrier and will, when the punches are lowered and consequently the distance between the movable carrier and the drive for the first grate band is reduced, be loose and thus will disengage the associated rollers or wheels.

According to a preferred embodiment of the invention, at least at one end of the press, the further grate band arranged in a carrier and the associated filter cloth are passed over separate rollers which make it possible to tension the grate band and the filter cloth independently of each other. In this way the device and the servicing of the fruit press according to the invention will be greatly facilitated. Moreover, the possibility of guiding the brake band and filter cloth over desired distances furnishes the further possibility to provide cleaning means for the grate band and/or the filter cloth which cleaning means may be arranged within the range between the independent rollers for the grate band and the filter cloth. These rollers are advantageously provided at the exit of the press. Thus, for instance, a brush for cleaning the grate band may be arranged within the loop formed by the filter cloth and extending above the grate band, while beater means may be provided for beating the inner side of the filter cloth. While the purpose of the brush consists in freeing the grate band from the relatively minor impurities which have passed through the filter cloth, the operation of the beater means is very important in order to loosen the pulp particles which are anchored in the filter cloth before the pulp layer peels off from the filter cloth at the reversing point of the latter. Particularly advantageous are beater means formed by bands which are arranged radially with regard to a rotating shaft and have their ends equipped with beater weights. Such beaters have a particularly good effect. The beater means may be formed by a metal strip of U-shaped cross-section. These metal strips are slipped onto the ends of the bands preferably formed by straps and are connected to the ends of the bands. In order to protect the filter cloth against a premature wear and damage by the beater means, it is possible, between the beater means and the filter cloth, to provide a flexible protective layer which may be formed, for instance, by a mat of rubber or synthetic material.

As a further means of cleaning the grate band, it is suggested to provide at the outlet end of the filter cloth in the carrier a cleaning brush for the filter cloth below the reversing point of the filter cloth. This brush will remove the residual pulp particles which remained in the cloth after the pulp layer has peeled off.

For purposes of driving the cleaning means, one or more electric motors may be connected in a simple manner to the frame. One electric motor will generally suffice for all cleaning means, the electric motor being connected to the drive, for instance, by means of chain drives. The feeding of the electric motor may be effected in a simple manner by means of flexible conductors which connect the motor to a current supply source.

For purposes of suspending a carrier on the press punch, according to one embodiment of the invention, the lateral marginal areas of the press punch and of the carrier are provided with eyes which are interconnected through guiding bolts, said guiding bolts extending parallel to the direction of movement of the punch and being provided with abutments determining the maximum distance between the punch and the carrier. A particularly good guiding is realized when the buiding bolts are fixedly arranged in the eyes of the carrier and are in their longitudinal direction displaceably mounted in the eyes of the press punch. With such an arrangement of the guiding bolts it will be assure that without any additional steps the guiding bolts will not interfere when the press punch is lowered, because the bolts will move outwardly in upward direction from the eyes on the press punch and will be located laterally of the press punch where there is sufficient space.

Referring now to the drawings in detail, the fruit press illustrated therein comprises a pressing stage or station in the form of a punch press which includes a press table 1 and a press punch arranged above said press table and adapted to be raised and lowered relative thereto. The press table 1 is mounted on transverse beams 3 of a press frame which also comprises lateral vertical beams 4 and longitudinal beams 5 and 6 interconnecting said vertical beams. In addition to the transverse beams 3, further transverse beams 7 are mounted between the vertical beams 4. These beams 7 are arranged in spaced relationship to and above the press table 1 while the cylinders 9 of three hydraulic cylinder piston units rest against the bottom side of the transverse beams 7 through the intervention of an assembly plate 8. The pistons 10 of the three hydraulic cylinder piston units are connected to the press punch 2. The supply of oil under pressure for lowering and raising the press punch is controlled by means of a control device 13 which is connected to a pump operable by an electric motor 11. The employment of three cylinder piston units makes it possible to actuate a large-surface punch 2 in a uniform manner and thereby to exert a uniform pressure upon large surfaces without subjecting the punch to undue stresses.

A grate band 21 passes over the press table 1. The purpose of band 21 consists in conveying the fruit mash to be pressed out by the press according to the invention from a charging device 22 to the pressing station. This grate band comprises transverse bars which near their ends are connected to chain links. The grate band 21 is at both ends of the press table 1 passed over deviating rollers 30 and 31 and, guided by additional deviating rollers 32, moves below the transverse beams 3 carrying the press table 1 from the deviating roller 31 to the deviating roller 30 at the input side. The deviating roller 31 arranged at the output end of the press table 1 is preferably used for driving the grate band.

Within the range of the press table 1, the grate band 21 is covered by a filter cloth 33. This filter cloth is passed over driving rollers 34 and 35 of which the roller 34 is in the extension of the press table 1 located ahead of the input side roller 30 for the grate band while the other roller 35 is arranged in spaced relationship to and behind the output roller 31 for the grate band 21. A further deviating roller 36 is in connection with one of the deviating rollers 32 for the grate band used for returning the filter cloth from the output side roller 35 to the input side roller 34. The filter cloth 33 likewise moves below the transverse beams 3 of the press frame and simultaneously below the there located section of the grate band 21. Rollers 37 journalled on the lower longitudinal beams 5 of the press frame support from below those sections of the grate band 21 and filter cloth 35 which are guided below the transverse beam 3 of the press frame. In order to impart upon the filter cloth the same advance as upon the grate band 21, the output side roller 35 for the filter cloth 32 is driven by a motor M.

The fruit press, illustrated by way of example in the drawings, makes it possible in the pressing station 2 simultaneously to press out superimposed layers of mash. To this end, between the press table 1 and the punch 2 there is provided a beam 41 with a further grate band 42 and a filter cloth 43 covering the grate band 42 within the range of the pressing station.

Figure 2:
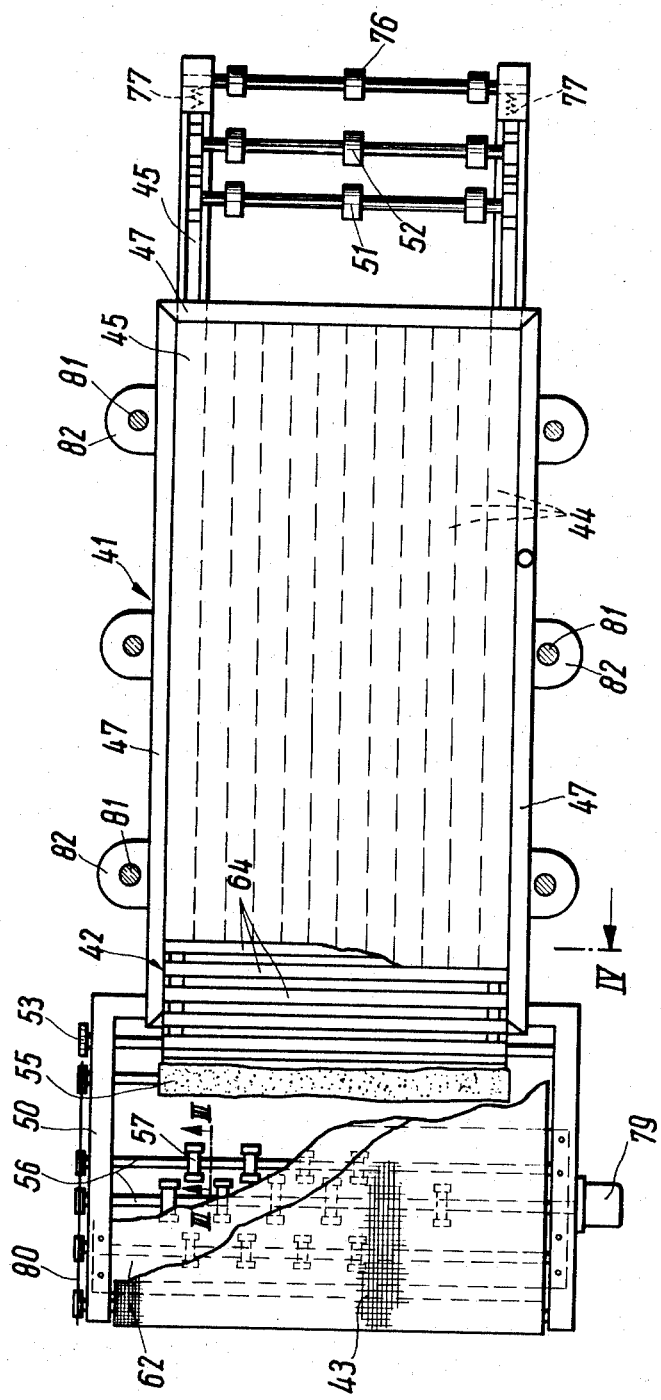
FIG. 2 is a top view of the support provided between the press punch and the press table, with a further grate band, FIG. 2 being seen along the line II—II of FIG. 1.

As will be evident from FIG. 2, the beam 41 forms within its range which is located below the press punch 2 a table plate 45 built up of I-beams 44. The top side of table plate 45 is provided with a one-layer cover layer 46 (FIG. 4). This table plate is surrounded by a juice trough 47 which at the lowest portions thereof is provided with outlets 48 which are located above a juice trough 14 provided on press table 1 and surrounding the same. In pressing position, the outlets 48 of the juice trough 47 provided on the table of beam 41 lead into the juice troughs 14 of the press table so that the juice will be able to flow off through the troughs 14 on the press table.

Adjacent the table plate 45 of the beam there are provided front and rear frame sections 49 in which the necessary deviating rollers for the grate band 42, for the filter cloth 43 and the cleaning brushes and beaters are mounted. The front and inlet side frame section 49 extends up to the charging device 22 but is shorter than that section of the grate band 21 which is located at the input side and pertains to the press table 1, and shorter than the filter cloth 33 pertaining to the grate band. In this way a drop chute 23 of the charging device 22 is able ahead of the input end of the beam 41 to deposit mash upon the grate band 21 and the filter cloth 33 of the press table. A second chute 24 of the charging device 22 is located above those sections of the grate band 42 and the filter cloth 43 which extend beyond the frame section 49 of the beam 41 at the input side and which sections are guided over deviating rollers 51 and 52 respectively journalled in this frame section. The chutes 23 and 24 of the charging device 22 which, when viewing in the longitudinal direction of the fruit press, are arranged one behind the other start from a distributor 25 which is adjacent a fruit grinder 26 which receives fresh fruit 27 from a supply funnel. By means of the distributor 25, the fruit mash freshly ground by the grinder 26 may selectively be conveyed to the chute 23 or the chute 24 so that a uniform distribution of the fruit mash to the two grate bands can be assured.

In the frame section 50 at the output side there is provided a deviating roller 53 for the grate band 42 directly adjacent the rear edge of the table plate 45. The corresponding deviating roller 54 for the filter cloth 43 is located in considerable spaced relationship to the deviating roller 53 for the grate band and, more specifically, at the end of the frame section 50. Within the range between these two rollers 50 and 53 there are provided a cleaning brush 55 adjacent the deviating rollers 53 for the grate band, and three shafts 56 with beater means 57 for beating against the bottom side of the filter cloth to thereby loosen the pulp which, after the juice has been squeezed out, remains on the filter cloth.

Figure 3:
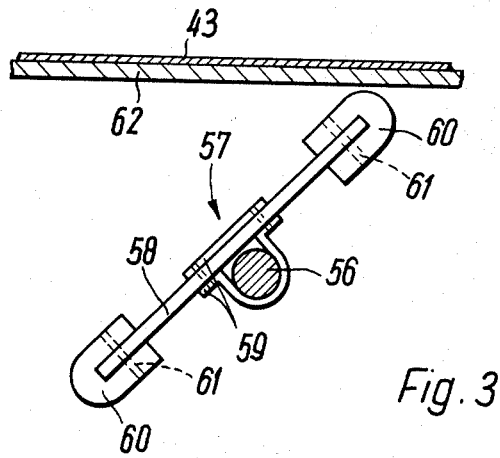
FIG. 3 illustrates on a larger scale than FIG. 2 a section taken along the line III—III of FIG. 2 and shows a beater.

As will be evident from FIG. 3, the beater means 57 connected to shafts 56 comprise straps 58 which by means of clips 59 are radially connected to the shafts 56 and have their ends equipped with beater weights 60. These beater weights 60 are formed by metal strips of U-shaped cross-section which are slipped onto the ends of the straps 58 and are connected to the ends of the band by rivets 61. In order to protect the filter cloth against damage by the beater weights 60 of the beater 57, between the filter cloth 43 and the beaters 57 there is provided a flexible protective layer 62 the marginal areas of which are connected to the arms of the frame section 50. This protective layer may be built up by strong flexible foils of rubber or synthetic material. Moreover, at the frame section 50 at the output side, there is provided a brush 63 for cleaning the filter cloth 43. This brush is located below the deviating roller 54 for the filter cloth. A similar arrangement of cleaning brushes 38 and beaters 39 is located also within the range of the rollers 31 and 35 located at the output side and pertaining to the grate band 21 and the filter cloth 33 respectively which band and cloth pass over the press table 1.

In a similar manner in which the grate band 21 and the filter cloth 33 for the press table 1 are returned below the press table 1 from the output side to the input side of the press, also the grate band 42 on the beam 41 and the pertaining filter cloth 43 on the bottom side of the table plate 45 are returned from the output side to the input side of the press in order that the table plate below the press punch 2, similar to the press table 1, is covered only by the grate band and the filter cloth therebelow. In order to make sure that on the other hand the return section of the grate band 42 with the filter cloth 43 therebelow does not come into contact with the layer of fruit mash on the press table 1 and in order to prevent that, during the pressing operation, fruit juice will collect in the space between the transverse bars 64 of the grate band 42, the bottom side of the table plate 44 is, as shown in FIG. 4, provided with a cover plate 65 covering from below the grate band 42 and the filter cloth 43. This cover plate 65 is, by means of bolts 66 guided in supporting arms 67 mounted on side surfaces of table plate 44, movably suspended vertically with regard to the bottom side of the table plate in order to have said cover plate firmly engage the bottom sections of the grate band 42 and filter cloth 43 and in order that simultaneously said cover plate 65 can press these sections of band 42 against the bottom side of table plate 44. For purposes of strengthening the cover plate 65, the lateral marginal areas 68 there of are angled upwardly as shown in FIG. 4.

It has proved expedient to provide the bottom side of the press punch of such fruit press with a cover cloth 71 which is passed over deviating rollers 72 which are mounted, for instance, by means of arms 73 on the ends of the press punch 2. Cover cloth 71 moves along the bottom side of the press punch 2 in a double layer. A corresponding cover cloth 74 is also provided at the bottom side of beam 41 so that this cover cloth moves in two layers along the bottom side of the cover plate 65. This cover cloth 74 is at the output end of beam 41 guided over a deviating roller 75 which is arranged adjacent the brush 63 for the filter cloth 43. The deviating roller 76 located at the inlet end of beam 41 is arranged ahead of the deviating roller 52 for the filter cloth 43 in the front frame section 49 of the beam 41. Roller 76 is mounted for resilient movement in the longitudinal direction of the cover cloth 74 in order that the cover cloth will always remain under tension. Such spring arrangement is more favorable for the cover cloth 74 than the adjustability of the inlet side rollers 51 and 52 for tensioning the grate band 52 and the filter cloth 43. This is due to the fact that the pulp will, when pressing out the juice, so to speak, dig into the cover cloth and, when the grate band resting on the press table 1 is advanced, will have to take along the cover cloth. The springs 77 acting upon the roller 76 make possible a better start of this band.

In contrast to the cover cloth 74, also the grate band 42 and the filter cloth 43 of the beam 41 are driven as the grate band 21 and filter cloth 33 of the press table, because the grate band with the filter cloth serves for introducing the mash from the charging device 22 into the pressing station. The grate band and the filter cloth have prior to each pressing operation to be advanced by the length of the press table in order that a layer of mash having the length of the press punch 2 will arrive in the pressing station. The stepwise drive of the grate band 42 and filter cloth 43 must occur when the press punch 2 is lifted off the mash layer on the grate band 42 and when the table plate 45 of beam 41 is to be lifted off from the mash layer located on the grate band 21 of the press table. At this time, also the grate band 21 with the filter cloth 33 of the press table are displaced. The advance of the two grate bands and filter cloths is effected simultaneously. It is for this reason that the deviating rollers 53 and 54 serving for driving the grate band 42 and filter cloth 43 of beam 41 are connected to the drive for the grate band passing over the press table 1 and the pertaining filter cloth. This driving connection is established by means of a chain drive 78 diagrammatically illustrated in FIG. 1. The chain drive 78 connects the roller 53 for the grate band 42 of beam 41 with the driven deviating roller 31 for the grate band 21 of the press table. This chain drive is so designed that it will establish driving connection to the deviating roller 53 of beam 41 only when the said beam occupies its upper rest position. The front deviating roller 54 which simultaneously serves as driving roller for the filter cloth 43 is operatively connected to the corresponding deviating roller 53 for the roller band and, more specifically, through a non-illustrated chain drive. In contrast thereto, the cleaning elements associated with the rear frame portion 50 of the beam 41, namely the cleaning brushes 55 and 63 as well as the beater means 57 connected to shafts 56, are provided with a drive of their own which includes an electric motor 79 connected to a press frame section 50. This electric motor drives one of the beater shafts 56, and the rotation of this shaft is conveyed to the other beater shafts as well as to the cleaning brushes 55 and 63 by means of the chain drive 80.

Figure 1:
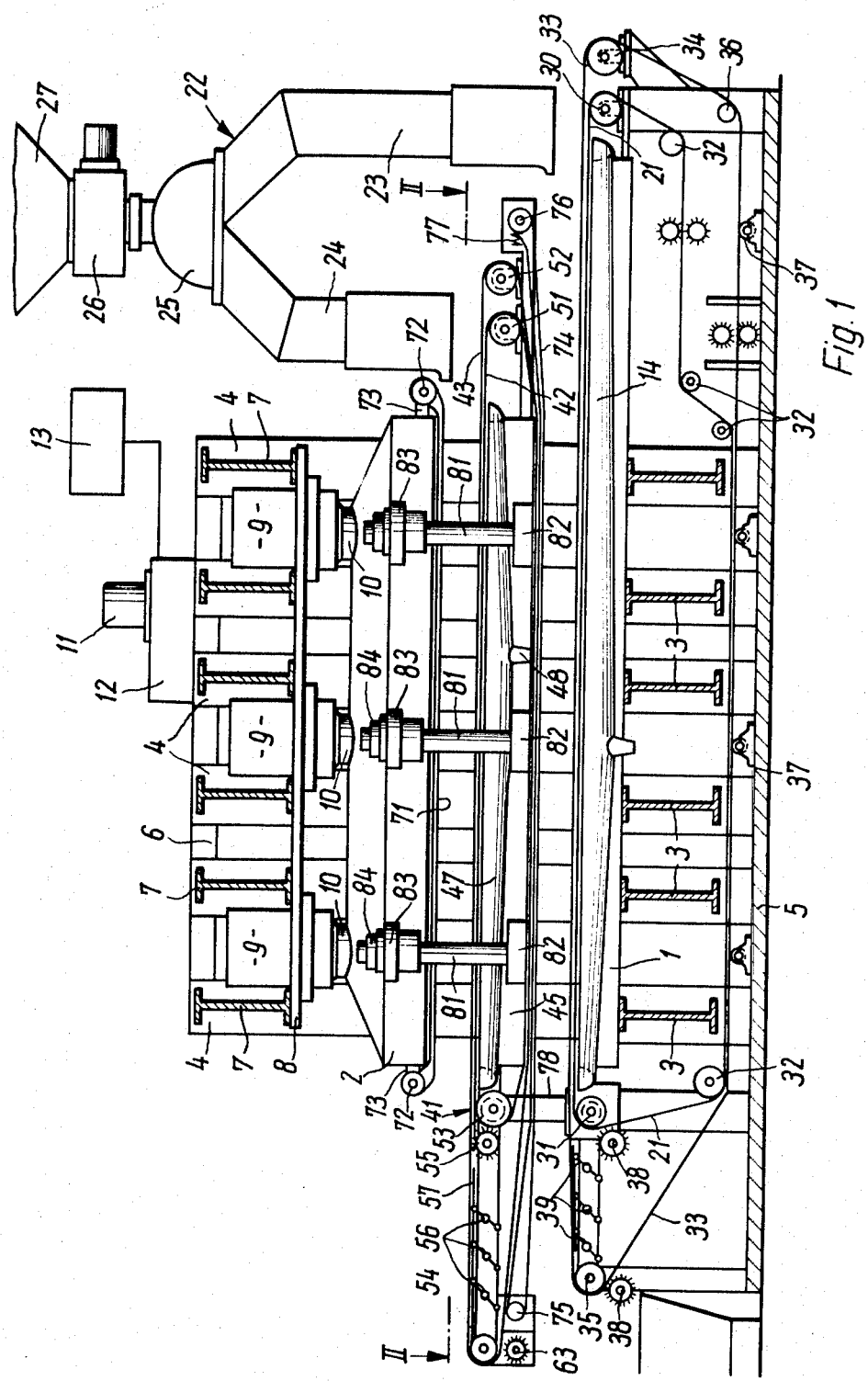
FIG. 1 is a side view of a fruit press according to the invention in which that part of the press frame has been omitted which faces the viewer of the drawing.

The beam 41 between press punch 42 and press table 1 is by means of guiding bolts 81 arranged on the press punch 2. These guiding bolts 81 are by means of eyes 82 and within the range of the table plate 45 connected to the lateral margins of the beam 41 in such a way that they extend upwardly substantially perpendicularly with regard to the surface of the table plate. These guiding bolts 81 penetrate into corresponding eyes 83 mounted on the lateral margins of the press punch 2. The bolts 81 are movably guided in these eyes 83 in their longitudinal direction. Those ends of the guiding bolts 81 which protrude beyond the eyes 82 have abutment rings 48 screwed there onto which rings during the operation of the press abut the top side of the eyes 83 on punch 2. In the upper rest position, therefore, as shown in FIG. 1, the beam 41 with the additional grate band 42 and the pertaining filter cloth 43 are suspended on the press punch 2 and supported by the guiding bolts 81. The abutment rings 84 of the guiding bolts 81 engage the upper side of the eyes 83 of punch 2. If by means of the grate bands 41 and 22 and the associated filter cloths 33, 43 one mash layer each is deposited upon the press table 1 below the table plate of the beam, the press punch 2 is lowered for squeezing out the juice of said mash layer. In this connection, first beam 41 follows the movement of the press punch until it has its bottom side rest on the mash layer on the press table 1. Then, first the beam 41 remains at rest until, during a further lowering of the press punch 2, the latter has its bottom side sit down on the mash layer which is located on the table plate 45 of the beam 41. Subsequently, the pressure exerted by the press punch 2 is conveyed by the mash layer located between punch 2 and beam 41 to beam 41 and from the latter to the second mash layer therebelow so that both mash layers are uniformly squeezed out at the same pressure. The squeezed out juice flows from plate 45 of beam 41 into the adjacent juice trough 47 from where the juice passed through outlets 48 into the juice trough 14 therebelow and pertaining to the press table 1. The juice squeezed out from the mash layer on the press table 1 passes directly into the juice trough 14 and from there is in a non-illustrated manner conveyed to suitable containers.

After a pressing operation, first the press punch 2 alone is lifted until its eyes 83 reach the abutment rings 84 on the guiding bolts 81 and then take along the beam 41. The guiding bolts 81 with the abutment rings 84 determine the greatest distance between the press punch 2 and the beam 41 which distance must be somewhat greater than the maximum thickness of the mash layer to be expected which maximum thickness may be about 5 cm. The total stroke of piston 2 must be so selected that also the beam 41 will be moved away from the press table 1 by a corresponding distance. When the press punch 2 and together with the latter the beam 41 has reached its uppermost position, the grate bands 21 and 42 together with their filter cloths 33 and 43 are advanced by the length of the press punch 2 so that two fresh mash layers are introduced into the press. At the same time the cleaning devices are put into operation which free the grate bands as well as the filter cloths from pulp material and other impurities. Thereupon in the above mentioned manner, the punch 2 of the press is lowered again so that the just described operation will be repeated.

It is obvious that without impairing or affecting the quality of the juice withdrawal by such additional beam, the output of a juice press can be doubled. It is also possible to provide more than one such beam and, accordingly, to triple the output of the fruit press or to increase the output to an even greater extent, depending on how many such beams are provided. It is also possible to suspend all beams directly on the press punch or on each other.

It is, of course, to be understood that the present invention is, by no means, limited to the particular showing in the drawings, but also comprises any modifications within the scope of the appended claims.

What is claimed is:

1. A press with a station for pressing juice from fruit mash and comprising: a bed member, a press punch movable toward and away from the bed member, at least one closed table member impermeable to through passage of the juice being interposed between said bed member and punch and suspended from said punch so as to have limited freedom of movement away from said punch, a mash charging device at one end of the press, each of said bed member and table member respectively having a grate band journalled thereon and a filter cloth over the respective grate band and both thereof movable over the respective member in a direction away from said charging device to convey mash advanced stepwise through the press station from said charging device into working position in the press, each grate band and filter cloth respectively being endless and having a return reach beneath the respective member, drive means for intermittently driving each said grate band and filter cloth, each member having deviating rollers thereon at the ends thereof about which the respective grate band and filter cloth pass, and each said closed table member having a cover plate suspended from the underside thereof for said grate band that passes below said closed table member and having limited freedom of movement substantially at right angles away from the respective table member.

2. A press according to claim 1 which includes an endless cover cloth for each cover plate having both reaches extending over the underside of the respective cover plate, and support rollers at opposite ends of each cover plate supporting the respective cover cloth and at least one thereof being spring urged in a direction to hold the respective cover cloth taut.

3. A press according to claim 1 in which the return reach of each grate band and filter cloth for each table plate is disposed between the underside of the respective table plate and the upper side of the respective cover plate.

4. A press according to claim 1 in which said bed member and each table member is substantially surrounded by a juice trough and wherein each juice trough above the lowermost one thereof drains into the juice trough next therebeneath.

5. A press according to claim 1 which includes separate deviating rollers for each grate band and the respective filter cloth at at least one end of the press to permit independent tensioning thereof.

6. A press according to claim 1 in which each grate band and the filter cloth pertaining thereto has respective deviating rollers at the end of the press opposite said charging device and arranged in longitudinally spaced relation, and cleaning means for at least said filter cloth arranged in the space between said deviating rollers.

7. A press according to claim 6 in which said cleaning means includes a brush for said grate band and beater means for beating on the inner side of said filter cloth.

8. A press according to claim 7 in which said beater means comprises at least one shaft, radial arms on said shaft, and U-shaped weights on the ends of said arms having the rounded ends thereof presented radially outwardly.

9. A press according to claim 1 which includes a cleaning brush for each filter cloth at the end of the press opposite said charging device end engaging the respective filter cloth at the leading end of the return reach thereof.

10. A press according to claim 1 which includes eyes along the sides of said punch, rods slidable in said eyes and connected to said table member, and stop collars on said rods above said eyes.

11. A press according to claim 1 in which said charging device has a discharge chute for the bed member and for each table member, said chutes being distributed longitudinally of the press, each table member terminating short of the chute for the next member therebeneath.

* * * * *